United States Patent
Craig et al.

(10) Patent No.: US 7,643,900 B2
(45) Date of Patent: Jan. 5, 2010

(54) METHOD OF CONTROLLING A SCREW IN A TWO-STAGE INJECTION UNIT AND A SYSTEM FOR IMPLEMENTING THE METHOD

(75) Inventors: Denise Davina Craig, Etobicoke (CA); Eric Thomas Scott, Bolton (CA); Raymond Weiping Zhang, Brampton (CA)

(73) Assignee: Husky Injection Molding Systems Ltd., Bolton, ON (CA)

( * ) Notice: Subject to any disclaimer, the term of this patent is extended or adjusted under 35 U.S.C. 154(b) by 210 days.

(21) Appl. No.: 11/837,963

(22) Filed: Aug. 13, 2007

(65) Prior Publication Data

US 2009/0045538 A1 Feb. 19, 2009

(51) Int. Cl.
 *B29C 45/76* (2006.01)
 *B29C 45/47* (2006.01)
(52) U.S. Cl. .................. 700/200; 700/204; 264/40.4; 425/145
(58) Field of Classification Search .......... 700/200, 700/204; 425/145, 561; 264/40.1, 40.4
 See application file for complete search history.

(56) References Cited

U.S. PATENT DOCUMENTS

| | | | |
|---|---|---|---|
| 3,728,056 A | 4/1973 | Theysohn | |
| 4,290,701 A | 9/1981 | Schad | |
| 4,804,505 A | 2/1989 | Venzke | |
| 5,281,384 A | 1/1994 | Banks | |
| 6,017,210 A | 1/2000 | Takayama et al. | |
| 6,089,849 A | 7/2000 | Bulgrin et al. | |
| 6,241,932 B1 * | 6/2001 | Choi et al. | 264/328.8 |
| 6,365,075 B1 | 4/2002 | Kamiguchi et al. | |
| 6,824,374 B1 * | 11/2004 | Seta et al. | 425/145 |
| 7,160,102 B2 | 1/2007 | Zimmet | |
| 7,172,407 B2 | 2/2007 | Zimmet | |
| 2005/0161847 A1 | 7/2005 | Weatherall et al. | |

FOREIGN PATENT DOCUMENTS

| | | |
|---|---|---|
| CA | 1257757 A | 7/1989 |
| CA | 2368755 A1 | 10/2000 |
| CA | 2396544 C | 5/2002 |
| CA | 2508466 | 6/2004 |
| EP | 1769898 A1 | 4/2007 |
| JP | 07052210 A | 2/1995 |
| WO | WO 2004/073955 * | 9/2004 |

* cited by examiner

*Primary Examiner*—Albert DeCady
*Assistant Examiner*—Steven R Garland
(74) *Attorney, Agent, or Firm*—Husky Intellectual Property Services

(57) ABSTRACT

Embodiments of the present invention teach a method of controlling a screw in a two-stage injection unit and a system for implementing the method. For example, a method of controlling a screw in a two-stage injection unit, the method executable at a computing apparatus associated with the two-stage injection unit is disclosed. The method comprises receiving an indication of an operational parameter associated with the screw of the two-stage injection unit; based on the indication of the operational parameter, determining a target speed ($S_{TARGET}$) for the screw, the target speed ($S_{TARGET}$) being sufficient to enable the screw to produce a required amount of material in a molten state; causing the screw to rotate at the target speed ($S_{TARGET}$), thereby causing the screw to operate in a substantially continuous manner.

23 Claims, 3 Drawing Sheets

US 7,643,900 B2

METHOD OF CONTROLLING A SCREW IN A TWO-STAGE INJECTION UNIT AND A SYSTEM FOR IMPLEMENTING THE METHOD

TECHNICAL FIELD

The present invention generally relates to, but is not limited to two-stage injection units and more specifically, but not limited to, a method of controlling a screw in a two-stage injection unit and a system for implementing the method.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

A typical molding system includes inter alia an injection unit, a clamp assembly and a mold assembly. The injection unit can be of a reciprocating screw type or of a two-stage type. Within the reciprocating screw type injection unit, raw material (such as PET pellets and the like) is fed through a hopper, which in turn feeds an inlet end of a plasticizing screw. The plasticizing screw is encapsulated in a barrel, which is heated by barrel heaters. Helical flights of the screw convey the raw material along an operational axis of the screw. Typically, a root diameter of the screw is progressively increased along the operational axis of the screw in a direction away from the inlet end.

As the raw material is being conveyed along the screw, it is sheared between the flights of the screw, the screw root and the inner surface of the barrel. The raw material is also subjected to some heat emitted by the barrel heaters and conducted through the barrel. As the shear level increases in line with the increasing root diameter, the raw material, gradually, turns into substantially homogenous melt. When a desired amount of the melt is accumulated in a space at discharge end of the screw (which is an opposite extreme of the screw vis-à-vis the inlet end), the screw stops its rotation. The screw is then forced forward (in a direction away from the inlet end thereof), forcing the desired amount of the melt into one or more molding cavities. Accordingly, it can be said that the screw performs two functions in the reciprocating type injection unit, namely (i) plasticizing of the raw material into a substantially homogeneous melt and (ii) injecting the substantially homogeneous melt into one or more molding cavities.

The two stage injection unit can be said to be substantially similar to the reciprocating type injection unit, other than the plasticizing and injection functions are separated. More specifically, an extruder screw, located in an extruder barrel, performs the plasticizing functions. Once a desired amount of the melt is accumulated, it is transferred into a so-called "shooting pot" equipped with a plunger, which performs the injection function.

U.S. Pat. No. 6,241,932 issued to Choi et al. on Jun. 5, 2001 discloses a method and system of operating a two stage injection molding machine wherein movement of the injection plunger in the shooting pot is coordinated with movement of the plasticizing screw and melt flow into the shooting pot such that the plunger provides minimal resistance to the melt flow into the shooting pot while avoiding the production of voids or air inside the melt. The undesired shear forces to which the melt is exposed are thus reduced, correspondingly reducing the melt degradation products which would otherwise result.

U.S. Pat. No. 6,017,210 issued to Takayama et al. on Jan. 25, 2005 discloses a system whereby a dwelling cycle is performed at the same time of metering by using an injection machine 1 and a dwelling machine 2. The injection machine 1 comprises an injection screw 11 mounted in a heating cylinder 12. The dwelling machine 2 comprises a dwelling plunger 21 slidably mounted therein and faced to a resin passage 14. An advancing motion of the dwelling plunger 14 is limited to the side surface of the resin passage while a backward movement of the dwelling plunger is limited to a position at which a desired volume of a resin trap 26 is formed for the resin to be packed in the passage between the head of the plunger and the resin passage 14. The dwelling plunger 21 is allowed to be in a free state during an injection cycle or the metering. The dwelling plunger 21 is retracted by means of a pressure of the resin to be injected or a pressure of a metered resin to from the resin trap 26. The resin in the resin trap 26 is forced into the resin passage 14 as the dwelling plunger 21 moves forward when the injection cycle is completed and the valve 16 is closed to block the resin passage 14. This provides the dwelling.

U.S. Pat. No. 7,160,102 issued to Zimmet on Jan. 9, 2007 discloses an injection unit for injection molding machines includes an extruder as plasticizing unit and a plunger-type injection molding device that can be coupled to the injection molding machine by an injection nozzle. The plunger-type injection molding machine has an injection plunger, wherein the area in front of the injection plunger forms an injection space which is connected to a forward end of the extruder by a melt channel, with a shutoff valve disposed in the melt channel. The extruder can be continuously operated and has one or more plasticizing screws for plastification, wherein the extruder is so configured that a backup length is able to increase backwards into the extruder, when the shutoff valve is closed.

U.S. Pat. No. 7,172,407 issued to Zimmet on Feb. 6, 2007 discloses an injection unit for an injection molding machine includes a plasticizing unit in the form of an extruder, a plunger-type injection device, which can be connected to the injection molding machine by an injection nozzle. The plunger-type injection device defines an injection space. The extruder has a forward portion which is connected to the injection space by a melt through channel in which a shutoff valve is disposed. The extruder is operated continuously and includes one or more plasticizing screws, wherein the extruder is configured in such a way that the backup length can expand backwards into the extruder, when the shutoff valve is closed.

U.S. Pat. No. 4,290,701 issued to Schad on Sep. 22, 1981 discloses a plasticizing screw of an injection-molding machine, axially movable in an extruder barrel, is driven by a tubular input shaft via a splined quill partly retractable into the shaft with which the quill is coupled through an internally and externally splined bushing. Another such bushing is removably seated, for possible replacement by a similar bushing of different inner diameter, in an internally splined cup-shaped head of the quill and engages the splined rear end of the screw. The quill head rests via a thrust bearing against the front end of a nonrotatable tubular piston coaxially surrounding the quill and entering by its rear end an annular cylinder which is hydraulically connected with a pressure accumulator including a gas cushion. The accumulator creates a back pressure by which molding material, plasticized by the screw during the preceding phase in which the screw was repressed into a rear position, is introduced via a check valve into a shooting pot alongside the extruder barrel. Another tubular injection piston extends rearwardly into an annular injection cylinder, which is pressurized only briefly upon closure of the mold, and bears at its front end upon a plunger penetrating into the shooting pot whose effective capacity is determined by a manually adjustable backstop for the injection piston. Lubricating oil from a sump in a gearbox surrounding the input shaft is pumped by the reciprocation of the quill, through passages provided for this purpose, to spaces inside the input and inside the extruder piston communicating with each other through the splines of the quill.

U.S. Pat. No. 5,281,384 issued to Banks on Jan. 25, 1994 discloses an improved method for injection molding including the steps of plasticizing a shot of molding material with the extruder running at a high rpm, transferring the shot to an accumulator means with the extruder running at a low rpm, and injecting the shot into a mold cavity.

SUMMARY OF THE INVENTION

According to a first broad aspect of the present invention, there is provided a method of controlling a screw in a two-stage injection unit, the method executable at a computing apparatus associated with the two-stage injection unit. The method comprises receiving an indication of an operational parameter associated with the screw of the two-stage injection unit; based on the indication of the operational parameter, determining a target speed ($S_{TARGET}$) for the screw, the target speed ($S_{TARGET}$) being sufficient to enable the screw to produce a required amount of material in a molten state; causing the screw to rotate at the target speed ($S_{TARGET}$), thereby causing the screw to operate in a substantially continuous manner.

According to a second broad aspect of the present invention, there is provided a two-stage injection unit. The two-stage injection unit comprises a barrel with a screw operatively mounted therewithin; a shooting pot in fluid communication with the barrel; a computing apparatus operatively coupled to the screw for controlling operation thereof; the computing apparatus being configured: receive an indication of an operational parameter associated with the screw of the two-stage injection unit; based on the indication of the operational parameter, determining a target speed ($S_{TARGET}$) for the screw; transmit a control signal representative of the target speed ($S_{TARGET}$) towards the screw; whereby the control signal causes the screw to rotate at the target speed ($S_{TARGET}$) in a substantially continuous manner while producing a required amount the material in a molten state.

According to a third broad aspect of the present invention, there is provided a human-machine interface (HMI). The HMI comprises a first interface for at least providing information to an operator; a second interface for at least receiving an instruction from the operator; the first interface configured to present the operator an actuating entity for enabling the operator to select an operational mode wherein a screw rotates in a substantially continuous manner.

According to a fourth broad aspect of the present invention, there is provided a computer readable storage medium containing a program element for execution by a computing apparatus, the program element for rendering the computing apparatus to receive an indication of an operational parameter associated with the screw of the two-stage injection unit; based on the indication of the operational parameter, determine a target speed ($S_{TARGET}$) for the screw, the target speed ($S_{TARGET}$) being sufficient to enable the screw to produce a required amount of material in a molten state; cause the screw to rotate at the target speed ($S_{TARGET}$), thereby causing the screw to operate in a substantially continuous manner.

According to another broad aspect of the present invention, there is provided a method of controlling a screw in a two-stage injection unit, the method executable at a computing apparatus associated with the two-stage injection unit, the two-stage injection unit being associated with a recovery cycle, the recovery cycle having at least a recovery stage and a transfer stage. The method comprises calculating a target speed ($S_{TARGET}$) for the screw, such that when the screw rotates at the target speed ($S_{TARGET}$), it reaches a back position at an instance in time that substantially coincides with an instant in time when the transfer stage commences; causing the screw to rotate at the target speed ($S_{TARGET}$) at least during the recovery stage.

DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF EMBODIMENTS

Inventors have appreciated that there exists a problem associated with known two-stage injection units. More specifically, due to the typical practice of controlling the plasticizing screw in a rotation-stop-rotation manner, the material inside a screw channel is subjected to mechanical shearing and heat conduction during the rotational stage(s), but on the other hand, during the stop (or idling) stage, the material is stationary and is only subject to heat conduction. As a consequence, the material so-produced has different thermal history and, thus, can exhibit non-homogenous melt quality. Additionally, in certain circumstances (such as, but not limited to, where colorants are not used), the added residency time actually serves to further degrade the molten material, and for some types of materials resulting in higher Acetaldehyde (AA) levels. Finally, where a hydraulic extruder (screw) motor is used, starting and stopping the screw every cycle introduces a severe hydraulic shock to various hydraulic components, resulting in potential premature component failure.

Figure 1:
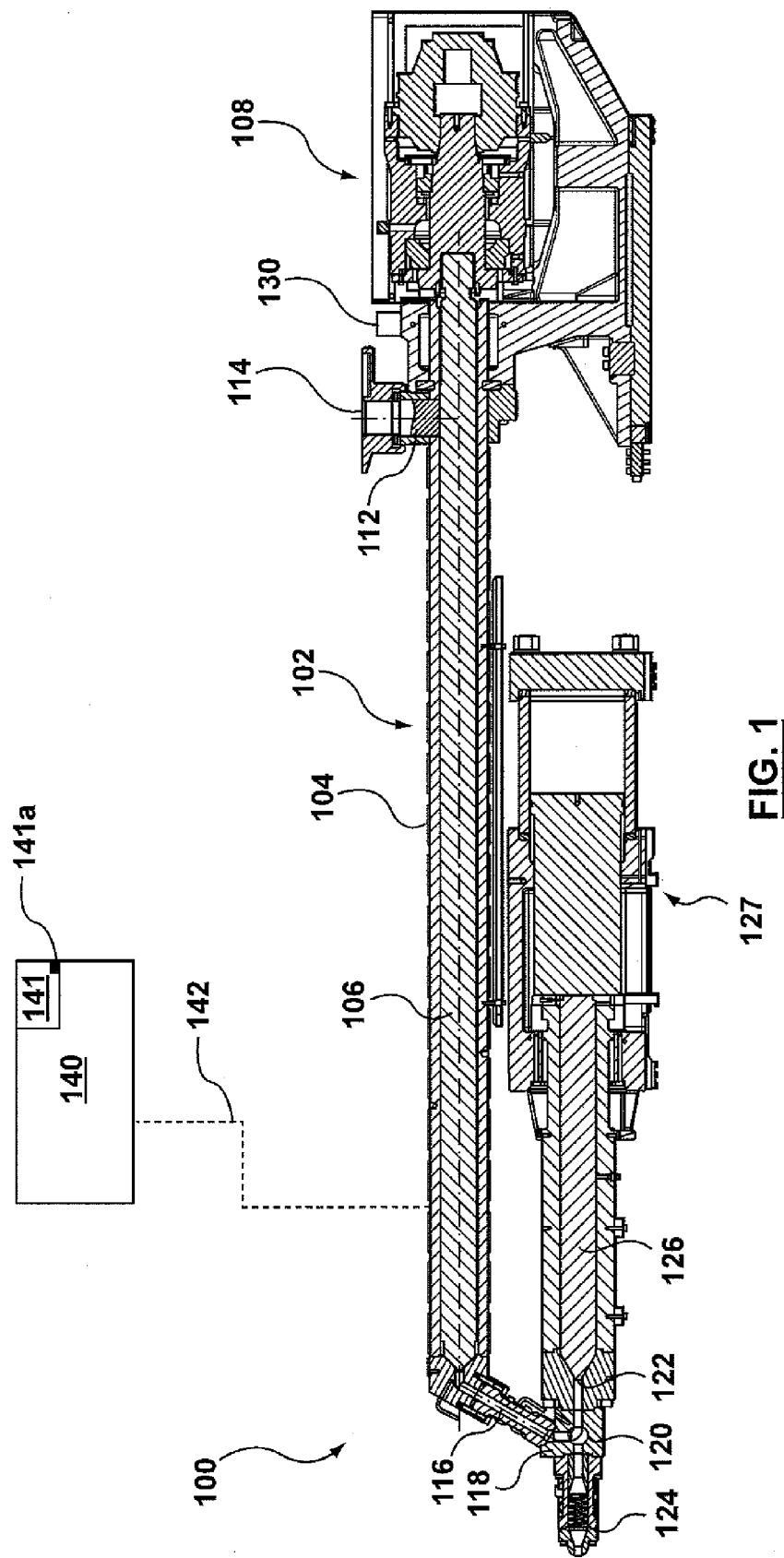
FIG. 1 depicts a cross-section view of a non-limiting embodiment of an injection unit.

With reference to FIG. 1, there is depicted an injection unit 100 that can be configured to implement embodiments of the present invention. The injection unit 100 is of a two-stage type and to that extent, the injection unit 100 comprises a barrel 102 and a shooting pot 122. The barrel 102 is associated with a plurality of barrel heaters 104. It should be noted that the number of or construction of the plurality of barrel heaters 104 is not particularly limited and those skilled in the art will readily appreciate a number of alternative implementations for the plurality of barrel heaters 104. The plurality of barrel heaters 104 is divided in multiple zones that can be separately controlled to assist in reaching the desired consistency of the melt. However, in alternative non-limiting embodiments of the present invention, the plurality of barrel heaters 104 can be grouped into a single control zone.

There is also provided a screw, schematically depicted in FIG. 1 at 106, rotatably mounted within the barrel 102. The screw is actuated by a screw actuator 108. In the specific non-limiting embodiment of the present invention, the screw actuator 108 comprises a hydraulic motor; however, this need not be so in every embodiment of the present invention. As such, it should be appreciated that the screw actuator 108 can be implemented differently, such as an electric-based actuator, a mechanical actuator or a combination thereof.

In the specific non-limiting embodiment depicted herewith, the screw actuator 108 impacts a rotational movement to the screw 106. Within the specific non-limiting embodiment being depicted herein, the screw 106 is also associated with an axial reciprocal movement, but this need not be so in every embodiment of the present invention. The axial reciprocal movement of the screw 106 is actuated by the screw actuator 108, however in alternative non-limiting embodiments of the present invention, the reciprocal movement can be impacted by a separate actuator (not depicted).

It should be noted that in the specific non-limiting embodiment depicted in FIG. 1, the screw 106 does not make use of a non-return valve for preventing the back flow of material 112 in the molten state during a melt transfer stage, to be described in greater detail herein below. In alternative non-limiting embodiments of the present invention, the screw 106 may be associated with a non-return valve (not depicted).

Material 112 is introduced into the barrel 102 via an inlet receptacle 114. The material 112 can comprise plastic (such as PET, Polypropylene or the like) or any other suitable material (such as metal for Thixomolding and the like). As the screw 106 rotates (for example, as being actuated by the screw actuator 108), material 112 is advanced towards a barrel head 116. In fluid communication with the barrel head 116 is a distributor 118. Fluid communication between the barrel head 116 and the distributor 118 is implemented via a valve 120. The valve 120 is selectively actuatable between (i) an open position, in which fluid communication is enabled between the barrel head 116 and the shooting pot 122, and (ii) a closed position in which the shooting pot 122 is in fluid communication with a nozzle 124.

The shooting pot 122 is associated with an injection plunger 126 operatively disposed within the shooting pot 122. The injection plunger 126 is actuated by an injection plunger actuator 127, which in this particular embodiment of the present invention is implemented as an injection piston which actuates the injection plunger 126 via hydraulic means. However, in alternative non-limiting embodiments of the present invention, the injection plunger 126 can be actuated by a different type of actuator, such as mechanical actuator, electrical actuator and the like.

Volume of melt accumulated before injection into a mold can be controlled by the injection plunger 126. Within the specific non-limiting embodiment of the present invention, the injection plunger actuator 127 also controls the volume of melt accumulated, for example, by means of controlling pressure exerted onto the injection plunger 126 by hydraulic actuator. However, in alternative non-limiting embodiments of the present invention, separate volume adjustment means (not depicted), which are configured to control the maximum volume of the shooting pot 122 and, accordingly, the maximum shot size by delimiting the rearmost position (rearmost right position, if viewed in FIG. 1) beyond which the injection plunger 126 can not move, can be provided.

The operation of the screw 106 and the shooting pot 122 will now be described generally with reference to various stages of a recovery cycle for plasticizing the material 112. The recovery cycle can be broadly divided into a screw recovery stage, a melt transfer stage and a melt packing stage.

Screw Recovery Stage

At this stage, the screw 106 rotates at a rotation speed $S_{TARGET}$ (as will be described in greater detail herein below). As the screw 106 rotates, it gradually transfers material 112 fed via the inlet receptacle 114 away from the inlet receptacle 114 or, in other words, rotation of the screw 106 moves the material 112 forward (in left-bound direction as viewed in FIG. 1). During the course of the forward movement, the material 112 comes in contact with an inner wall (not separately numbered) of the barrel 102 (which is heated by means of the plurality of barrel heaters 104). The material 112 is also affected by shear between the screw 106 and the inner wall (not separately numbered) of the barrel 102. Thus, as the material 112 moves forward, it gets heated and melted.

By the time the material 112 reaches the barrel head 116, it reaches a substantially molten state. As will be appreciated by those of skill in the art "substantially molten state" is the state of the material 112 where it is suitable for transferring into the shooting pot 122 and, eventually, for injection, under pressure, into the one or more molding cavities.

During this stage, the valve 120 is kept in the closed position and material 112 in the molten state is accumulated in the barrel head 116 and in a discharge end (not separately numbered) of the barrel 102, thus forcing the screw 106 rearwardly away from the barrel head 116.

The screw recovery stage continues until a required volume of material 112 is plasticized. Generally speaking, the screw recovery stage continues until the screw 106 reaches an utmost-rearward position (the utmost-reward position can be based on an input provided by an operator and generally corresponds to the required volume of material 112), which is also sometimes referred to by those of skill in the art as a "back position".

Screw Creeping Stage (Optional)

In some embodiments of the present invention, creeping stage can be implemented. Within these embodiments of the present invention, as the screw 106 approaches the back position, the rotation speed of the screw 106 is reduced to what is called a "creeping speed". Within embodiments of the present invention, the creeping stage is triggered by determining a linear position of the screw 106 and, more specifically, how far the screw 106 is from the back position. For the avoidance of doubt, even though the creeping speed is lower than the $S_{TARGET}$, it is nevertheless greater than zero or, in other words, the screw 106 continues rotating through the creeping stage. During the creeping stage, the screw actuator 108 waits for a control signal to move to the melt transfer stage.

It should be noted that in alternative non-limiting embodiments of the present invention, the creeping stage can be omitted.

Melt Transfer Stage

At this stage, when the shooting pot 122 is ready to accept the material 112, the valve 120 is actuated into the open position and the screw 106 is advanced forwardly (for example, by means of the screw actuator 108). At this stage, material 112 begins the transfer from the barrel head 116 to the shooting pot 122.

As the transfer of the material 112 progresses, the injection plunger 126 is actuated rearwardly (i.e. in the right-bound direction as viewed in FIG. 1). In some embodiments of the present invention, the injection plunger 126 is "passively" pushed back under pressure of the material 112 being transferred. In other embodiments of the present invention, the injection plunger 126 is "actively" pulled back, for example, the injection plunger 126 can be pulled back by the injection plunger actuator (not depicted).

The melt transfer stage continues until the injection plunger 126 reaches the rearmost right position, as controlled by the injection plunger actuator 127, as has been described in greater detail herein above. At this stage, the screw 106 reaches an outmost-forward position, which is also sometimes referred to by those of skill in the art as a "cushion position". As can be appreciated by those skilled in the art, in the cushion position there exists a certain amount of material 112 in front the screw 106, which is generally done (i) to prevent the screw 106 from being damaged from metal-on-metal contact between a face of the screw 106 and a face of the barrel 102 and/or (ii) to provide a "melt reserve" for a melt packing stage (described herein below).

During the melt transfer stage, the screw 106 continues to rotate. In some embodiments of the present invention, the screw 106 can continue to rotate at the $S_{TARGET}$. In other embodiments of the present invention, the screw 106 can rotate at a speed different from the $S_{TARGET}$, for example at a lower or a higher speed. It should be, however, noted that within embodiments of the present invention, the screw 106 continues to rotate during the melt transfer stage. The speed of rotation during the melt transfer stage can be also thought of as a transfer rotation speed.

Melt Packing Stage

At this stage, the screw 106 continues to rotate at a so-called packing speed (which can be greater than the $S_{TARGET}$ or the transfer rotation speed), in order to ensure that no air is accidentally introduced into the material 112 being transferred between the barrel head 116 and the shooting pot 122. The melt packing stage continues until a pre-determined time interval has expired.

Once the pre-determined time interval for the melt packing stage has expired, the screw 106 starts a new recovery cycle and goes back to the screw recovery stage.

Injection Stage

In parallel with at least a portion of the screw recovery cycle, an injection stage commences. At this stage, the valve 120 is actuated into the closed position and the material 112 accumulated in the shooting pot 122 in injected into one or more molding cavities. Injection of the material 112 is implemented by advancing the injection plunger 126 by means of the injection plunger actuator (not depicted).

Also provided within the architecture of FIG. 1, is a first sensor 130. The first sensor 130 can be configured, for example, to determine linear position associated with the screw 106. In a specific non-limiting implementation, the first sensor 130 can be implemented as a temposonic position sensor, however, other suitable implementations for the first sensor 130 will become apparent to those of skill in the art. The first sensor 130 can further be configured to transmit a signal representative of the linear position associated with the screw 106.

Within the architecture depicted in FIG. 1, there is also provided a computing apparatus 140. The computing apparatus 140 can be configured to control one or more operation of the molding system (not depicted) in general and the injection unit 100, in particular. To that extent, there is schematically shown a connection 142 between the computing apparatus 140 and the injection unit 100.

The computing apparatus 140 can be implemented as part of a controller that controls various operations of the molding system. Alternatively, the computing apparatus 140 can be implemented as a separate computing device configured to control only certain operations or operations of a certain component of the molding system (ex. the injection unit 100). Some examples of the functions that can be controlled by or some routines that can be executed by the computing apparatus 140 include, but are not limited to: (i) coordinating execution of the aforementioned recovery cycle and the injection stage, (ii) controlling rotation speed of the screw, (iii) actuating the valve 120 between the open position and the closed position; (iv) controlling axial movement of the screw 106, the injection plunger 126, etc.

Even though the connection 142 is schematically depicted between the computing apparatus 140 and the injection unit 100, this need not be so in every embodiment of the present invention. Accordingly, it should be understood that the computing apparatus 140 can be coupled to other components of the molding system (not depicted), as well as to more than one component of the molding system, either in series or in parallel. Furthermore, it should be understood that the connection 142 can be implemented either as a wireless link, a wired link or as a combination of the two.

The computing apparatus 140 can comprise internal memory 141 configured to store one or more instructions for executing one or more routines. Additionally, the computing apparatus 140 may comprise a reader (not depicted) for reading one or more type of a computer-readable medium (not depicted) that stores one or more instructions for executing one or more routines. The internal memory 141 can also be configured to store a stored operational parameter 141A. The stored operational parameter 141A can include an indication of: (i) linear position of the screw 106; (ii) cycle time; (iii) recovery time; (iv) idling time and the like.

To this extent, the computing apparatus 140 can also be coupled (either via the connection 142 or via a separate connection) to the first sensor 130. For example, the computing apparatus 140 can be coupled to the first sensor 130 by a dedicated wireless link (not depicted). The computing apparatus 140 can be further configured to receive a signal from the first sensor 130 (the signal, for example, representative of the linear position of the screw 106), to interpret the received signal and/or store the received/interpreted signal in the internal memory 141 (for example, as stored operational parameter 141A).

Given the architecture described with reference to FIG. 1, it is possible to execute a method for controlling the screw 106 in a two-stage injection unit (such as, for example, the injection unit 100). Within embodiments of the present invention, the computing apparatus 140 executes a method for controlling a rotational speed associated with the screw 106. In some embodiments of the present invention, the computing apparatus 140 executes the method each cycle in order to determine a target speed $S_{TARGET}$, as will be described in greater detail herein below, to take into account operational variables that may change from cycle to cycle. Examples of such operational variables that may change include, but are not limited too: temperature of the material 112 fed through the inlet receptacle 114, moisture level associated with the material 112 fed through the inlet receptacle 114 and the like.

Generally speaking, the purpose of the method is to determine the target speed $S_{TARGET}$ and to cause the screw 106 to rotate at the target speed $S_{TARGET}$ such that: (i) a required quantity of material 112 is plasticized and (ii) rotations of the screw 106 does not stop or, put another way, to ensure that the screw 106 rotates in or substantially in continuous manner. In some embodiments of the present invention, the target speed $S_{TARGET}$ can be further selected such that the target speed $S_{TARGET}$ is substantially constant throughout the complete recovery cycle of the screw 106.

Figure 2:
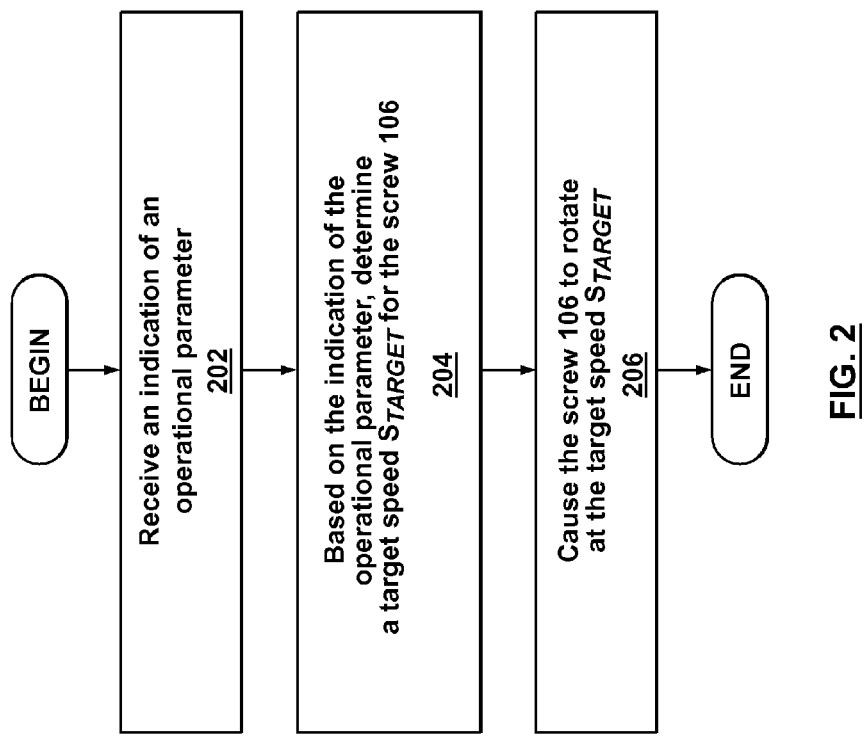
FIG. 2 depicts a flow chart of a method implemented within a computing apparatus associated with the injection unit of FIG. 1, implemented according to a non-limiting embodiment of the present invention.

With reference to FIG. 2, the method for controlling the screw 106 in a two-stage injection unit (such as, for example, the injection unit 100), implemented according to a non-limiting embodiment of the present invention, will now be described in greater detail. The method can be conveniently executed, for example, at the computing apparatus 140. The computing apparatus 140 can store a computer executable code for rendering the computing apparatus 140 operable to execute the method in the internal memory 141 or, alternatively, the computing apparatus 140 can accept a computer-readable medium that stores the computer executable code.

In some embodiments of the present invention, the computing apparatus 140 executes the method for controlling the screw 106 at a beginning of the screw recovery stage. In other embodiments of the present invention, the computing apparatus 140 executes the method for controlling the screw 106 at a beginning of each screw recovery stage. In some embodiments of the present invention, the computing apparatus 140 executed the method for controlling the screw 106 after receiving an appropriate command, such as, for example a "continuous recovery command" entered by an operator using, for example, a human-machine interface or, simply, HMI, as will be described in greater detail herein below with reference to FIG. 3.

Step 202—Receive an Operational Parameter

At step 202, the computing apparatus 140 receives an operational parameter. In a specific non-limiting implementation of the present invention, the computing apparatus 140 retrieves the aforementioned stored operational parameter 141A from the internal memory 141. In alternative non-limiting embodiments of the present invention, the computing apparatus 140 can request and, responsive to the request, receive an indication of the operational parameter from one or more sensors (such as, for example, the first sensor 130) substantially in real time.

For the purposes of the illustration to follow, it shall be assumed that the computing apparatus 140 retrieves stored operational parameter 141A from the internal memory 141.

In some embodiments of the present invention, the stored operational parameter 141A may include an indication of:

(i) linear position of the screw 106, herein below referred to as $P_{SCREW}$; expressed for example in millimeters;

(ii) recovery time, herein below referred to as $T_{RECOVERY}$; expressed for examples in seconds;

(iii) idling time, herein below referred to as $T_{IDLE}$; expressed for examples in seconds; and (iv) last known rotational speed of the screw 106, herein below referred to as $S_{REFERENCE}$, expressed for example in revolutions per minute (RPM) or revolutions per second (RPS). For the avoidance of doubt, the $S_{REFERENCE}$ denotes the speed that the screw 106 rotated at during a previous cycle (ex. for example, during the previous recovery cycle).

In some embodiments of the present invention, the stored operational parameter 141A may further include a constant value $V_{CONSTANT}$ representative of a distance traveled $D_{TRAVEL}$ by the screw 106 (in millimeters) per rotation of the screw 106 expressed as $R_{SCREW}$ per unit of time expressed as $T_{SEC}$. In other words, $V_{CONSTANT}$ can be represented as follows:

$$V_{CONSTANT} = \frac{D_{TRAVEL}}{R_{SCREW}} \times \frac{1}{T_{SEC}}$$

However, in alternative non-limiting embodiment of the present invention, the computing apparatus 140 may verify that the $V_{CONSTANT}$ is indeed a constant value by re-calculating the value each time it executes the method according to non-limiting embodiments of the present invention.

It is worthwhile exploring how an indication of the stored operational parameter 141A is obtained by the computing apparatus 140. An indication of the linear position of the screw 106 can be obtained from the first sensor 130. In some embodiments of the present invention, the computing apparatus 140 can query the first sensor 130 from time to time (for example, every cycle, at a given time interval and the like) and, responsive to the query, to receive the indication of the linear position of the screw 106. In other embodiments of the present invention, the first sensor 130 can transmit from time to time (such as every cycle, at a given time interval and the like) the indication of the linear position of the screw 106.

An indication of recovery time, idling time can be received from an operator, for example, by means of the human-machine interface (will be discussed in greater detail herein below with reference to FIG. 3). Alternatively, the indication of the recovery time, idling time, as well as the current (or previous) rotational speed of the screw 106 can be appreciated by the computing apparatus 140 by virtue of the computing apparatus 140 controlling various aspects of the operation of the molding system (not depicted) generally and the injection unit 100, in particular.

It is worthwhile noting that execution of the method according to non-limiting embodiments of the present invention can be triggered by a command inputted by an operator. It is contemplated that the operator will start operating the injection unit 100 in a manner known in the art and the operator will wait for the injection unit 100 will perform a number of recovery cycles in order to achieve what is called a "stable cycle". The operator can the trigger execution of the method according to embodiments of the present invention (as will be explained in greater detail herein below). Accordingly, the indication of the $T_{IDLE}$ is an indication of the idling time at which the injection unit 100 is operated during a previous cycle (i.e. an indication of the time during which the screw 106 stopped rotating). As will be appreciated, as the method according to embodiments of the present invention is executed, the screw 106 will rotate substantially continuously and, as such, the indication of the $T_{IDLE}$ will comprise zero or a value substantially close to zero.

Step 204—Based on the Indication of the Operational Parameter, Determine a Target Speed $S_{TARGET}$ for the Screw 106

At step 204, the computing apparatus 140, based on the operational parameter received as part of step 202, determines the target speed $S_{TARGET}$ for the screw 106. In a specific non-limiting embodiment of the computing apparatus 140 determines the target speed $S_{TARGET}$ for the screw 106 based on the following formula:

$$S_{TARGET} = \frac{T_{RECOVERY}}{T_{RECOVERY} + T_{IDLE}} \times S_{REFERENCE}$$

Another way to look at the target speed $S_{TARGET}$ is that the target speed $S_{TARGET}$ is calculated such that the screw 106 reaches the back position at an instant in time that substantially coincides with an instant in time where the transfer stage commences.

Step 206—Cause the Screw 106 to Rotate at the Target Speed $S_{TARGET}$

At step 206, the computing apparatus 140 causes the screw 106 to rotate at the target speed $S_{TARGET}$. More specifically, the computing apparatus 140:

generates a control signal, the control signal for causing the screw 106 to rotate at the target speed $S_{TARGET}$;
releases the control signal towards the screw actuator 108 and more specifically to a controller (not depicted) of the screw actuator 108, such as a pump controller (not depicted). In a specific example, the control signal is released via the connection 142.

In some embodiments of the present invention, the computing apparatus 140 can also implement a verification routine. The verification routine can be implemented, for example, after step 206. More specifically, the verification routine can be implemented at a mid-point of the aforementioned screw recovery stage. Alternatively, the verification routine can be implemented after on-third of the recovery stage has been implemented. Other alternatives are, of course, also possible. For example, verification routine can be performed more than once. As another example, verification routine using an integration calculation (ex. Area Under Curve calculation) can be performed substantially constantly during the entirety of the recovery cycle of the screw 106.

Generally speaking, the purpose of the verification routine is to determine whether or not the current $S_{TARGET}$ is sufficient to obtain a required amount of the material 112 in the molten state. Within embodiments of the present invention, the require amount of material 112 in the molten state is meant to denote the entirety of the required amount of material 112 in the molted state required for a given shot size. More specifically, the computing apparatus 140 executes a calculation based on the following formulae:

$$S_{TARGET\ NEW} = D_{BACK\ POSITION} \times \frac{1}{T_{REMAINING} \times V_{CONSTANT}}$$

where:

$D_{BACK\ POSITION}$ represents a distance between the current linear position of the screw 106 and the aforementioned back position;

$T_{REMAINING}$ represents remaining time in a given recovery stage.

In a specific implementation of the present invention, $D_{BACK\ POSITION}$ can be determined by the computing apparatus 140 by transmitting a query to the first sensor 130 and receiving a response thereto, the response indicative of the current linear position of the screw 106. By subtracting the current linear position from the back position value, $D_{BACK\ POSITION}$ can be determined. Similarly, $T_{REMAINING}$ can be determined by the computing apparatus 140 by subtracting the time expired since the beginning of the given recovery stage from the total recovery time ($T_{RECOVERY}$) of a previous recovery cycle of the screw 106.

If the computing apparatus 140 determines that $S_{TARGET\ NEW}$ does not equal to $S_{TARGET}$ (taking into account a variance window) the computing apparatus 140 can adjust the speed of the screw 106 to the $S_{TARGET\ NEW}$, in a substantially the same manner as has been described above with reference to step 206. In some embodiments of the present invention, the variance window can be, for example, 5% variance or any other suitable value.

Figure 3:
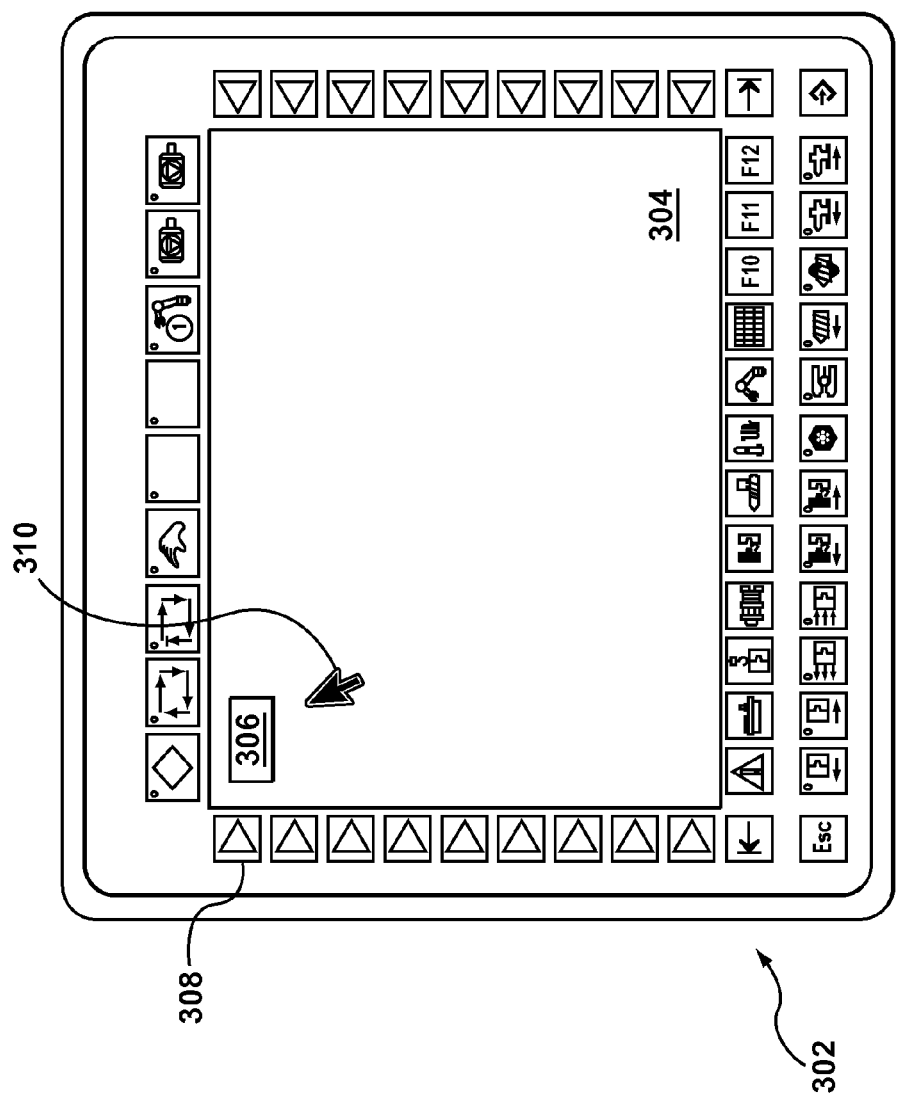
FIG. 3 depicts a schematic representation of a Human-Machine Interface which can be used to control the injection unit of FIG. 1, implemented according to a non-limiting embodiment of the present invention.

With reference to FIG. 3, a non-limiting embodiment of how the method for controlling the screw 106 can be triggered, will now be described in greater detail. FIG. 3 depicts a non-limiting embodiment of a Human-Machine Interface 302 or, simply, HMI 302, which can be adapted to implement embodiments of the present invention. The HMI 302 can be part of or be coupled to the computing apparatus 140. Generally speaking, the purpose of the HMI 302 is to display information to an operator and receive commands from the operator. To that extent, there is provided a first interface 304, which can be a screen. The first interface 304 is used to provide information to the operator. Alternatively, the first interface 304 can be touch-screen and, as such, can be used for both providing information to the operator, as well as receiving commands from the operator. Also, there is provided a second interface 308, which can be a selection of actuators, such as buttons, pointing devices and the like. The second interface 308 can be used for receiving commands from the operator. The first interface 304 can be configured to provide an actuating entity 306 (which can be a link, a button, an icon or any other entity being capable of being selected) to enable the operator to trigger execution of the method of controlling the screw 106. In a specific non-limiting embodiment, the actuating entity 306 comprises an icon with a representation of the following text "Continuous Screw Recovery ON" or any conceivable variant thereof. The operator can actuate the actuating entity 306 by using the first interface 304 (if the first interface 304 comprises a touch screen) or the second interface 308. Alternatively, the operator can actuate the actuating entity 306 by using a pointing entity 310, which can be moved by any suitable known means. When the actuating entity 306 is actuated, it can trigger execution of the method for controlling operational of the screw 106 according to various embodiments of the present invention.

A technical effect of embodiments of the present invention includes an increased output of the screw 106. Another technical effect of embodiments of the present invention may include reduced melt degradation and/or reduced levels of AA. Another technical effect of embodiments of the present invention may include improved melt homogeneity. Another technical effect of embodiments of the present invention may include improved energy utilization, due to equalization of the rotational speed of the screw 106. Another technical effect of embodiments of the present invention may include improved life of certain components of the injection unit 100 due to elimination or reduction in hydraulic shock to screw drive motors and/or the mechanical impact to the screw 106. Another technical effect of embodiments of the present invention may include improved additive mixing. It should be expressly understood that not all technical effects need to be realized, in their entirety, in each and every embodiment of the present invention.

To illustrate a technical effect of embodiments of present invention, reference is made to Table 1, which depicts operational characteristics of the screw 106 operating in a non-continuous manner according to prior art techniques and in a substantially continuous manner by implementing embodiments of the present invention.

TABLE No. 1

| Type of operation | RPMs | Dwell time | Total cycle | Throughput |
|---|---|---|---|---|
| Continuous | 39 | 0 sec | 13.9 sec | 526 kg/hour |
| Non-continuous | 45 | 2.5 sec | 13.9 sec | 456 kg/hour |

As can be clearly seen from Table 1, throughput can be substantially increased by using embodiments of the present invention (as illustrated in the "Continuous" row of Table 1). Table 1 also conveniently illustrates that within embodiments of the present invention, the screw 106 will rotate at lower RPMs.

The description of the embodiments provides examples of the present invention, and these examples do not limit the scope of the present invention. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A method of controlling a screw in a two-stage injection unit, the method executable at a computing apparatus associated with the two-stage injection unit, the method comprising:
    receiving an indication of an operational parameter associated with the screw of the two-stage injection unit;
    based on the indication of the operational parameter, determining a target speed ($S_{TARGET}$) for the screw, said target speed ($S_{TARGET}$) being sufficient to enable the screw to produce a required amount of material in a molten state;
    causing the screw to rotate at the target speed ($S_{TARGET}$), thereby causing the screw to operate in a substantially continuous manner,
    said operational parameter comprising at least: (i) an indication of recovery time ($T_{RECOVERY}$); (ii) an indication of idling time ($T_{IDLE}$); (iii) an indication of current rotational speed of the screw ($S_{REFERENCE}$); and wherein said determining comprises calculating said target speed ($S_{TARGET}$) based on a formulae expressed as:

$$S_{TARGET} = \frac{T_{RECOVERY}}{T_{RECOVERY} + T_{IDLE}} \times S_{REFERENCE}.$$

2. The method of claim 1, wherein said determining a target speed ($S_{TARGET}$) for the screw comprises determining speed ($S_{TARGET}$) for the screw such that when the screw rotates at the target speed ($S_{TARGET}$), it reaches a back position at an instance in time that substantially coincides with an instant in time when the transfer stage commences.

3. The method of claim 1, wherein said causing comprises generating a control signal representative of the target speed ($S_{TARGET}$).

4. The method of claim 3, further comprising releasing the control signal towards a screw actuator of the screw.

5. The method of claim 1, wherein said receiving an indication of an operational parameter comprises:
    retrieving a stored operational parameter from an internal memory.

6. The method of claim 5, wherein said stored operational parameter comprises at least one of:
    an indication of linear position of the screw ($P_{SCREW}$);
    an indication of recovery time ($T_{RECOVERY}$);
    an indication of idling time ($T_{IDLE}$);
    an indication of current rotational speed of the screw ($S_{REFERENCE}$);
    an indication of a constant value ($V_{CONSTANT}$).

7. The method of claim 5, further comprising obtaining an indication of stored operational parameter and storing the indication of the stored operational parameter in the internal memory.

8. The method of claim 7, wherein said obtaining an indication of stored operational parameter comprises receiving the indication of stored operational parameter from at least a first sensor.

9. The method of claim 7, wherein said obtaining an indication of stored operational parameter comprises appreciating the indication of stored operational parameter by virtue of controlling one or more functions of a molding system incorporating the two-stage injection unit.

10. The method of claim 1, further comprising executing a verification routine configured to determine if the target speed ($S_{TARGET}$) is sufficient to obtain the required amount of material in a molten state.

11. The method of claim 10, using an operating parameter comprising at least (i) an indication of the target speed ($S_{TARGET}$); (ii) an indication of a distance between a current linear position and a back position ($D_{BACK\ POSITION}$); (iii) an indication of a remaining time in a current recovery cycle ($T_{REMAINING}$); and (iv) an indication of a constant parameter ($V_{CONSTANT}$); wherein said executing a verification routine comprises calculating a current target speed ($S_{TARGET\ NEW}$) based on a formulae expressed as:

$$S_{TARGET\ NEW} = D_{BACK\ POSITION} \times \frac{1}{T_{REMAINING} \times V_{CONSTANT}}.$$

12. The method of claim 11, further comprising:
    if said current target speed ($S_{TARGET\ NEW}$) does not equal to said target speed ($S_{TARGET}$) within a variance window, causing the screw to rotate at the current target speed ($S_{TARGET\ NEW}$).

13. The method of claim 12, wherein said causing the screw to rotate at the current target speed ($S_{TARGET\ NEW}$) comprises generating a control signal representative of the target speed ($S_{TARGET\ NEW}$).

14. The method of claim 13, further comprising releasing the control signal representative of the target speed ($S_{TARGET\ NEW}$) towards a screw actuator of the screw.

15. The method of claim 10, wherein said executing a verification routine comprises executing the verification routine at a midpoint of a recovery stage.

16. The method of claim 10, wherein said executing a verification routine comprises executing the verification routine at a one-third-point of a recovery stage.

17. The method of claim 10, wherein said executing a verification routine comprises executing the verification routine substantially continuously throughout a recovery stage.

18. The method of claim 1, wherein said required amount of material comprises an amount equivalent to a desired shot size.

19. A two-stage injection unit comprising:
    a barrel with a screw operatively mounted therewithin;
    a shooting pot in fluid communication with said barrel;
    a computing apparatus operatively coupled to said screw for controlling operation thereof; the computing apparatus being configured:
        receive an indication of an operational parameter associated with the screw of the two-stage injection unit;
        based on the indication of the operational parameter, determining a target speed ($S_{TARGET}$) for the screw;

transmit a control signal representative of the target speed ($S_{TARGET}$) towards the screw;

whereby said control signal causes the screw to rotate at the target speed ($S_{TARGET}$) in a substantially continuous manner while producing a required amount material in a molten state, said operational parameter comprising at least: (i) an indication of recovery time ($T_{RECOVERY}$); (ii) an indication of idling time ($T_{IDLE}$); (iii) an indication of current rotational speed of the screw ($S_{REFERENCE}$); and wherein said computing apparatus is configured to calculate said target speed ($S_{TARGET}$) based on a formulae expressed as:

$$S_{TARGET} = \frac{T_{RECOVERY}}{T_{RECOVERY} + T_{IDLE}} \times S_{REFERENCE}.$$

20. The two-stage injection unit of claim 19, wherein said target speed ($S_{TARGET}$) for the screw is determined such that when the screw rotates at the target speed ($S_{TARGET}$), it reaches a back position at an instance in time that substantially coincides with an instant in time when the transfer stage commences.

21. The two-stage injection unit of claim 19, wherein said required amount of material comprises an amount equivalent to a desired shot size.

22. A computer readable storage medium containing a program element for execution by a computing apparatus, the program element for rendering the computing apparatus to:

receive an indication of an operational parameter associated with a screw of a two-stage injection unit;

based on the indication of the operational parameter, determine a target speed ($S_{TARGET}$) for the screw, said target speed ($S_{TARGET}$) being sufficient to enable the screw to produce a required amount of material in a molten state;

cause the screw to rotate at the target speed ($S_{TARGET}$), thereby causing the screw to operate in a substantially continuous manner, said operational parameter comprising at least: (i) an indication of recovery time ($T_{RECOVERY}$); (ii) an indication of idling time ($T_{IDLE}$); (iii) an indication of current rotational speed of the screw ($S_{REFERENCE}$);

and wherein said computing apparatus is configured by the program element to calculate said target speed ($S_{TARGET}$) based on a formulae expressed as:

$$S_{TARGET} = \frac{T_{RECOVERY}}{T_{RECOVERY} + T_{IDLE}} \times S_{REFERENCE}.$$

23. The computer readable storage medium of claim 22, wherein said target speed ($S_{TARGET}$) for the screw is determined such that when the screw rotates at the target speed ($S_{TARGET}$), it reaches a back position at an instance in time that substantially coincides with an instant in time when the transfer stage commences.

* * * * *